(12) United States Patent
Kondoh et al.

(10) Patent No.: US 8,723,848 B2
(45) Date of Patent: May 13, 2014

(54) IMAGE DISPLAY APPARATUS AND IMAGE DISPLAY METHOD

(75) Inventors: Naoko Kondoh, Osaka (JP); Toshiyuki Gotoh, Osaka (JP); Hozumi Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 537 days.

(21) Appl. No.: 13/119,686

(22) PCT Filed: Sep. 16, 2009

(86) PCT No.: PCT/JP2009/004621
§ 371 (c)(1),
(2), (4) Date: Mar. 17, 2011

(87) PCT Pub. No.: WO2012/032442
PCT Pub. Date: Mar. 25, 2010

(65) Prior Publication Data
US 2011/0169795 A1 Jul. 14, 2011

(30) Foreign Application Priority Data

Sep. 18, 2008 (JP) ................................. 2008-239924
Sep. 18, 2008 (JP) ................................. 2008-239925
Oct. 8, 2008 (JP) ................................. 2008-262044

(51) Int. Cl.
*G06F 3/038* (2013.01)
*G09G 5/00* (2006.01)

(52) U.S. Cl.
USPC .............................. 345/207; 345/87; 345/102

(58) Field of Classification Search
USPC ...................... 345/82, 102, 87, 207
See application file for complete search history.

(56) References Cited

U.S. PATENT DOCUMENTS

2007/0297172 A1* 12/2007 Furukawa et al. ............. 362/231
2008/0150880 A1* 6/2008 Inuzuka et al. ................ 345/102
2008/0180686 A1* 7/2008 Sakai et al. .................... 356/511

FOREIGN PATENT DOCUMENTS

EP          1 453 030 A1    9/2004
EP          1 705 636 A1    9/2006
JP          2001-142409 A   5/2001

(Continued)

OTHER PUBLICATIONS

Extended European Search Report, dated Oct. 12, 2011, issued in corresponding International Application PCT/JP2009/004621.

(Continued)

*Primary Examiner* — Viet Pham
(74) *Attorney, Agent, or Firm* — Birch, Stewart, Kolasch & Birch, LLP

(57) ABSTRACT

It is expected to provide an image display apparatus and image display method that can reduce the risk that an image quality is undermined due to a halo phenomenon caused by the leak of light passing through a non-corresponding color filter from a LED. The image display apparatus can respectively control luminous efficiencies of plural color LEDs, i.e., R-LED (11a), G-LED (11b) and B-LED (11c) that emit light through a color filter to a displaying unit. The image display apparatus obtains luminous efficiencies for a frame of RGB image signal (S2), calculates a light leak amount and then detects whether the halo phenomenon may occur or not (S3-S5). When the halo phenomenon is considered to occur, the luminous efficiencies of LEDs (11a, 11b, 11c) included in the liquid crystal display apparatus are controlled to make the light from the LEDs (11a, 11b, 11c) become close to white light (S8).

20 Claims, 10 Drawing Sheets

(56) References Cited

FOREIGN PATENT DOCUMENTS

| | | |
|---|---|---|
| JP | 2005-258404 A | 9/2005 |
| JP | 2005-338857 A | 12/2005 |
| JP | 2007-322944 A | 12/2007 |
| JP | 2008-10397 A | 1/2008 |
| JP | 2008-51905 A | 3/2008 |
| JP | 2008-102379 A | 5/2008 |
| RU | 2146393 C1 | 3/2000 |
| WO | WO 2008/096468 A1 | 8/2008 |
| WO | WO 2008/099338 A1 | 8/2008 |

OTHER PUBLICATIONS

International Search Report, dated Dec. 22, 2009, issued in corresponding International Application PCT/JP2009/004621.

* cited by examiner

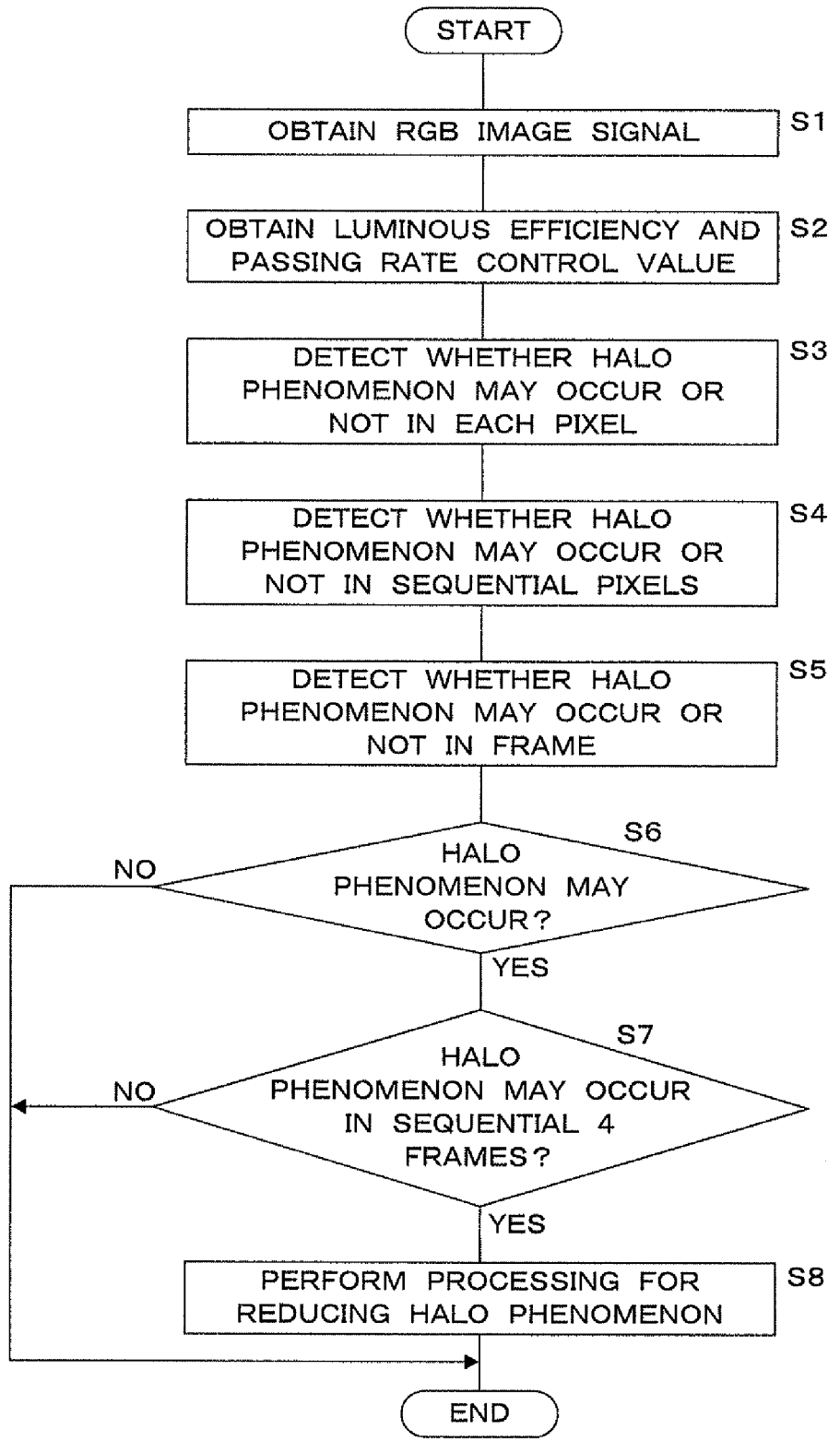

IMAGE DISPLAY APPARATUS AND IMAGE DISPLAY METHOD

CROSS-REFERENCE TO RELATED APPLICATION

This application is the national phase under 35 U.S.C. §371 of PCT International Application No. PCT/JP2009/004621 filed on Sep. 16, 2009, which claims priority under 35 U.S.C. 119(a) to Patent Application No. 2008-239924 filed in Japan on Sep. 18, 2008, Patent Application No. 2008-239925 filed in Japan on Sep. 18, 2008, and Patent Application No. 2008-262044 filed in Japan on Oct. 8, 2008, all of which are hereby expressly incorporated by reference into the present application.

BACKGROUND OF THE INVENTION

1. Field of the Invention

The present invention relates to an image display apparatus and an image display method in which light sources are driven to emit light for displaying an image, and relates to an image display apparatus and an image display method in which light sources emitting light to a displaying unit are controlled to display an image on the displaying unit.

2. Description of Related Art

A liquid crystal display makes a liquid crystal panel pass or block light emitted from a backlight, to display an image. The color reproducibility, color contrast and electric power consumption of liquid crystal display apparatus are mainly depend on the performance or control of a liquid crystal panel and backlight. Recently, it is proposed to utilize a driving method (referred as to "area active driving method", hereinafter) in which a backlight is divided into plural areas and a luminous efficiency of each area is controlled.

When a displayed image includes a low intensity portion, the area active driving method decreases the luminous efficiency of a backlight area corresponding to the low intensity portion and sets the passing rate of liquid crystal panel based on the decreased luminous efficiency. The luminous efficiency of the backlight can be optimized for each area, as described above. Thus, it is possible to reduce the electric power consumption required for whole of the backlight. In addition, the decrease of luminous efficiency for each area can reduce so-called "too little black phenomenon" (e.g., a condition where black looks faintly luminous on the screen turned off just now), and improve the contrast and image quality.

The area active driving method can utilize a RGB-LED (light-emitting diode) light source, as the backlight, configured with three LEDs dedicated to red (R), green (G) and blue (B). In order to utilize this RGB-LED light source, it is required not only to adjust the luminous efficiency for each area but also to control respective three LEDs in each area. For example, when a displayed image corresponding to some area is configured with only blue, the LED dedicated to red (referred as to "R-LED", hereinafter) and the LED dedicated to green (referred as to "G-LED", hereinafter) are turned off, the LED dedicated to blue (referred as to "B-LED", hereinafter) is turned on, and the passing rate of liquid crystal display panel is set in accordance with the luminous efficiency of B-LED. Thus, it is possible to display the image that is configured with only blue and has the high color purity. As described above, it is possible to control only the required LED among the LEDs located in each area. Thus, the utilization of RGB-LED light source can reduce the electric power consumption larger than the utilization of white light source. Furthermore, it is possible to obtain the high color gamut of displayed image, because the color purities of respective primary colors can be kept high.

A patent document 1 describes an apparatus and method that utilize such an area active driving method described above and can control the luminance and color property of local area on the backlight. In the apparatus and method of patent document 1, the liquid crystal display panel is divided into plural areas, and the backlight is configured with LEDs where light are emitted to each area from plural LEDs. The luminous efficiency of LED is controlled in accordance with the peak gradient value of each area on the liquid crystal display panel.

Patent document 1: Japanese Patent Application Laid-Open No. 2005-338857

SUMMARY OF THE INVENTION

The area active driving method utilizing the RGB-LED light source may cause a problem depending on the characteristics of color filter utilized for the liquid crystal panel. FIG. 9 is a schematic view showing relationships between the passing characteristics of color filter utilized for the liquid crystal panel and wavelengths of R-LED, G-LED and B-LED. For example, the characteristics of color filter dedicated to blue (referred to as "B-CF", hereinafter) partially overlaps with the wavelength of G-LED. Thus, the light emitted from the G-LED may pass through the B-CF and undesired light emitted from the G-LED may leak from the B-CF, even in the case that B-CF is utilized for passing only the light emitted from the B-LED. In the case that the luminous efficiencies of all LEDs are fixedly set to be the same, the ratio of B-CF regarding the passing amount of light from the B-LED to the passing amount of light from the G-LED is always the same. Thus, it is possible to prevent the occurance of light leak with the adjustment in which the leak amount of G-LED's light depending on the B-CF is taken into consideration at design time.

On the other hand, in the case that the luminous efficiency of each LED dynamically changes, the light leak amount also dynamically changes. FIG. 10 is a schematic view for explaining the light leak caused by the change of luminous efficiency. In FIG. 10, a screen displays a green rectangular image 101 on a blue background image 100. In addition, the screen is divided into plural areas including an area A and an area B, and the rectangular image 101 is displayed in the area A to be a little smaller size than the area A. In addition, the backlight is also divided in order to correspond to the plural areas of screen, and divided backlight is controlled to emit light based on each area.

In this case, only the B-LED is controlled to emit light in the area B in order to display only the blue background image 100 in the area B. Thus, light emitted from LEDs other than the B-LED do not pass through the B-CF in the area B, the light leak does not occur, and it is possible to display the image in blue having high color purity. On the contrary, B-LED and G-LED are controlled to emit light in the area A in order to display the blue background image 100 and the green rectangular image 101. Thus, light emitted from the G-LED do pass through the B-CF in the area A, and the light leak occurs. If the amount of light leak becomes larger, the displayed blue image becomes to have extremely higher luminance than normal proper luminance. Because of the light leak of green, the contoured portion 102 of rectangular image 101 and the perimeter of contoured portion 102 looks much bright blue on the screen. This phenomenon is so called "halo phenomenon" (in which a circle of light is generated faintly). Such a halo phenomenon causes undermining the image quality. However, if the halo phenomenon was reduced greater than seemed necessity, the normal proper color purity of image is undermined.

The present invention is made in view of such circumstances and has an object to provide an image display apparatus and image display method that can prevent the light leak and then prevent the image quality from being undermined.

In addition, the present invention has another object to provide an image display apparatus and image display method that can prevent the light leak without undermining the color purity of image and then prevent the image quality from being undermined.

An image display apparatus according to the present invention controls luminous efficiencies of plural light sources with plural colors which emit light to a displaying unit having a color filter, independently in accordance with gradients of image displayed on the displaying unit, and comprises: a detecting means for detecting a luminance heterogeneity or a color heterogeneity caused by a light leak of a light source other than a light source corresponding to a color filter on the displaying unit that has displayed an image; an obtaining means for obtaining respective luminous efficiencies of the light sources; and a controlling means for controlling the luminous efficiencies of the light sources to make a color of light, which is composite light combining light emitted from all of the light sources, become close to white, in accordance with a detection result of the detecting means and an obtainment result of the obtaining means.

An image display apparatus according to the present invention controls luminous efficiencies of plural light sources with plural colors which emit light to a displaying unit having a color filter, independently in accordance with gradients of image displayed on the displaying unit, and comprises: a detecting means for detecting a luminance heterogeneity or a color heterogeneity caused by a light leak of a light source other than a light source corresponding to a color filter on a partial area of the displaying unit that has displayed an image, for plural areas; an obtaining means for obtaining respective luminous efficiencies of the light sources; and a controlling means for controlling the luminous efficiencies of the light sources to make a color of light, which is composite light combining light emitted from all of the light sources, become close to white, in accordance with a number of areas for which the detecting means has detected the luminance heterogeneity or the color heterogeneity and with an obtainment result of the obtaining means.

An image display apparatus according to the present invention further comprises a banning means for banning the controlling means from controlling when the number of areas for which the detecting means has detected the luminance heterogeneity or the color heterogeneity is larger than a predetermined value.

An image display apparatus according to the present invention controls luminous efficiencies of a backlight having plural light sources with plural colors which emit light to a displaying unit having a color filter, in accordance with gradients of image displayed on the displaying unit, and comprises: a detecting means for detecting a luminance heterogeneity or a color heterogeneity caused by a light leak of a light source other than a light source corresponding to a color filter on a partial area of the displaying unit that has displayed an image; an obtaining means for obtaining respective luminous efficiencies of the light sources; and a controlling means for controlling the luminous efficiencies of the light sources to make a color of light, which is composite light combining light emitted from light sources of the backlight corresponding to the area for which the detecting means has detected the luminance heterogeneity or the color heterogeneity, become close to white light, in accordance with an obtainment result of the obtaining means.

An image display apparatus according to the present invention comprises
the controlling means that controls the luminous efficiencies of light sources to make light emitted from the light sources become close to white light, step-by-step from a perimeter of area detected by the detecting means to the detected area.

An image display apparatus according to the present invention comprises
the controlling means that controls the luminous efficiencies of the light sources, to make the light emitted from the light sources become close to white through an additive color mixing performed on the light emitted from the light sources.

An image display apparatus according to the present invention comprises the controlling means that keeps a luminous efficiency or luminance of a light source whose luminance is the highest in the luminance obtained by the obtaining means, and changes a luminous efficiency or luminance of a light source other than the kept light source.

An image display apparatus according to the present invention comprises: the detecting means that detects the luminance heterogeneity or the color heterogeneity, for each frame of the image; and the controlling means that controls the luminous efficiencies of the light sources when the detecting means detects the luminance heterogeneity or the color heterogeneity continuously in sequential frames.

An image display apparatus according to the present invention comprises the controlling means that makes the composite light become close to white with a speed based on a detection result of the detecting means.

An image display apparatus according to the present invention comprises
the controlling means that makes the composite light become close to white with a speed based on a number of areas for which the detecting means has detected the luminance heterogeneity or the color heterogeneity.

An image display apparatus according to the present invention comprises
the controlling means that makes the composite light of the light sources gradually become close to white.

An image display apparatus according to the present invention further comprises a determining means for determining whether the control performed by the controlling means should be stopped or not, during a period when the controlling means is controlling the luminous efficiencies of the light sources, in accordance with the detection result of the detecting means, wherein the controlling means controls the luminous efficiencies of the light sources to make the composite light become far from white with a speed slower than the speed for becoming close to white, when the determining means determines that the control performed by the controlling means should be stopped.

An image display method according to the present invention controls luminous efficiencies of plural light sources with plural colors which emit light to a displaying unit having a color filter, independently in accordance with gradients of image displayed on the displaying unit, and comprises steps of: detecting a luminance heterogeneity or a color heterogeneity caused by a light leak of a light source other than a light source corresponding to a color filter on the displaying unit that has displayed an image; obtaining respective luminous efficiencies of the light sources; and controlling the luminous efficiencies of the light sources to make a color of light, which is composite light combining light emitted from all of the light sources, become close to white, in accordance with the detected luminance heterogeneity or the detected color heterogeneity and with the obtained luminous efficiencies.

An image display method according to the present invention controls luminous efficiencies of plural light sources with plural colors which emit light to a displaying unit having a color filter, independently in accordance with gradients of image displayed on the displaying unit, and comprises steps of: detecting a luminance heterogeneity or a color heterogeneity caused by a light leak of a light source other than a light source corresponding to a color filter on a partial area of the displaying unit that has displayed an image, for plural areas; obtaining respective luminous efficiencies of the light sources; and controlling the luminous efficiencies of the light sources to make a color of light, which is composistion light combining light emitted from all of the light sources, become close to white, in accordance with a number of areas for which the luminance heterogeneity or the color heterogeneity is detected and with the obtained luminous efficiencies.

An image display method according to the present invention controls luminous efficiencies of a backlight having plural light sources with plural colors which emit light to a displaying unit having a color filter, in accordance with gradients of image displayed on the displaying unit, and comprises steps of: detecting a luminance heterogeneity or a color heterogeneity caused by a light leak of a light source other than a light source corresponding to a color filter on a partial area of the displaying unit that has displayed an image; obtaining respective luminous efficiencies of the light sources; and controlling the luminous efficiencies of the light sources to make a color of light, which is composite light combining light emitted from light sources of the backlight corresponding to the area for which the luminance heterogeneity or the color heterogeneity is detected, become close to white light, in accordance with the obtained luminous efficiencies.

According to the present invention, respective light sources are controlled to make the composite light from the plural light sources become close to white, when the luminance heterogeneity or the color heterogeneity occurs on the image displayed on the displaying unit. After the composite light becomes close to white light, a liquid crystal panel sets the passing rate to be lower for keeping a proper display color. Therefore, it is possible to reduce the risk that the quality of image displayed on the displaying unit is undermined due to undesired light passing from some light source.

According to the present invention, respective light sources are controlled to make the composite light from the plural light sources become close to white, when the luminance heterogeneity or the color heterogeneity due to the light leak of light source other than a light source corresponding to the color filter occurs on the image displayed on the displaying unit. After the composite light becomes close to white light, a liquid crystal panel sets the passing rate to be lower for keeping a display color. Therefore, it is possible to reduce the risk that the quality of image displayed on the displaying unit is undermined due to undesired light passing from some light source.

According to the present invention, respective light sources are controlled to make the composite light from the plural light sources become close to white, when the luminance heterogeneity or the color heterogeneity along a luminance increasing direction occurs on the image displayed on the displaying unit. Although the light emitted from the light source passes through the color filter of displaying unit, the color filter has characteristics that passes only light having a desired wavelength and blocks the other light not having the desired wavelength. Therefore, it is possible to block the white light with the color filter, in the case that the plural light sources with plural colors emit light and the composite light is made to become the white light. Hence, it is possible to reduce the risk that the quality of image displayed on the displaying unit is undermined due to undesired light passing from some light source.

In addition, it may be possible to reduce the risk that the color purity of displaying unit is undermined, when the luminous efficiencies of light sources are controlled in accordance with the number of areas for which the luminance heterogeneity or the color heterogeneity is detected. For example, when there is a larger number of areas for which the luminance heterogeneity is detected, it is expected that almost all areas of displaying unit cause the luminance heterogeneity or color heterogeneity. In this expected case, a viewer may recognize that the luminance heterogeneity or color heterogeneity is included in the original proper image, however the viewer may not care a bit about the included luminance heterogeneity or color heterogeneity. In this case, no control of luminous efficiencies can prefer preventing the color purity be reduced.

According to the present invention, the light emitted from the light sources are made to become close to white light step-by-step, and thus significant change of emitted light is prevented at the border of area where the luminance heterogeneity or color heterogeneity occurs.

According to the present invention, three light sources are provided for three colors: red, green and blue. Therefore, it is possible to make white, by mixing equal amount of light for red, equal amount of light for green and equal amount of light for blue.

According to the present invention, the control is conducted to keep the highest luminous efficiency of light source. Therefore, it is possible to eliminate the luminance heterogeneity or the color heterogeneity without compromising the original color purity. Hence, it is possible to reduce the risk that the quality of displayed image is undermined.

According to the present invention, the light sources are respectively controlled when the luminance heterogeneity or color heterogeneity is continuously caused in sequential plural frames at the time of displaying an image configured with plural areas. Thus, it is possible to reduce the risk that the color purity is compromised and the quality of displayed image is undermined due to the greater control of light source than seemed necessity. The "frame" means an image displayed on one screen. For example, in the case of method displaying two fields sequentially, the "frame" is an image combined with the R (red), G (green) and B (blue) of respective color configuring two fields. In the case of interlace method, the "frame" is an image combined with an image scanned at an odd row and an image scanned at an even row. In the case of non-interlace method, the "frame" is an image based on a vertical scanning.

According to the present invention, the composite light is made to become close to white with a speed based on the result of detecting the luminance heterogeneity or the color heterogeneity. Thus, it is possible to change color based on the contents of displayed image. For example, when there is a displayed image having a negligible luminance heterogeneity or color heterogeneity and the detection result shows a small value, the composite light may be made to shift a little closer to white, and thus it is possible to prevent the viewer who is looking at the image displayed on the displaying unit from feeling uncomfortable due to the color change. Furthermore, it is possible to reduce the risk that the color purity is compromised and the quality of displayed image is undermined due to the greater control of light source than seemed necessity. On the other hand, when there is a displayed image having a significant luminance heterogeneity or color heterogeneity, the composite light may be made to become almost white light, and thus it is possible to quickly eliminate the significant luminance heterogeneity or color heterogeneity. Therefore, it is possible to prevent the image quality from being undermined.

According to the present invention, the composite light is made to become close to white with a speed based on the result of detecting the luminance heterogeneity or the color heterogeneity. Thus, it is possible to change color based on the contents of displayed image. For example, when there is a displayed image having a negligible luminance heterogeneity or color heterogeneity and the detection result shows a small value, the composite light may be made to shift a little closer to white, and thus it is possible to prevent the viewer who is looking at the image displayed on the displaying unit from feeling uncomfortable due to the color change. Furthermore, it is possible to reduce the risk that the color purity is compromised and the quality of displayed image is undermined due to the greater control of light source than seemed necessity. On the other hand, when there is a displayed image having a significant luminance heterogeneity or color heterogeneity, the composite light may be made to become almost white light, and thus it is possible to quickly eliminate the significant luminance heterogeneity or color heterogeneity. Therefore, it is possible to prevent the image quality from being undermined.

According to the present invention, the composite light can be made to become close to white, step-by-step. Therefore, it is possible to prevent the viewer from feeling uncomfortable due to the color change.

According to the present invention, the light sources are controlled to make the composite light become far from white with a speed slower than the speed for becoming close to white, before the control of luminous efficiencies is stopped. Therefore, it is possible to prevent the viewer from feeling uncomfortable due to the drastic change of color.

According to the present invention, the light sources are respectively controlled to make the composite light with light emitted from plural light sources become close to white, when the image displayed on the displaying unit has the luminance heterogeneity or color heterogeneity caused by the leak of light emitted from a light source other than the light source corresponding to the color filter. Because the composite light can be close to the white light and the displaying unit can reduce own passing rate, it is possible to prevent the passing of undesired light from a light source and to reduce the risk that the quality of image displayed on the displaying unit is undermined When the composite light is made to become close to the white light, the liquid crystal panel reduce own passing rate for keeping the proper display color. Therefore, it is possible to prevent the passing of undesired light from a light source and to reduce the risk that the quality of image displayed on the displaying unit is undermined.

In addition, the light efficiencies of light sources may be controlled in accordance with the number of areas for which the luminance heterogeneity or color heterogeneity is detected, and thus it may be possible to reduce the risk that the quality of image displayed on the displaying unit is undermined. For example, when there are a large number of areas for which the luminance heterogeneity is detected, it is assumed that almost all areas of the displaying unit cause the luminance heterogeneities or color heterogeneities. In the assumed case, the viewer may feel that the luminance heterogeneity or color heterogeneity is included in the original proper image, however the viewer may not care a bit about the included luminance heterogeneity or color heterogeneity. Therefore, the control of luminous efficiencies is not conducted to prefer preventing the reduction of color purity caused by the control of luminous efficiencies.

The above and further objects and features of the invention will more fully be apparent from the following detailed description with accompanying drawings.

BRIEF DESCRIPTION OF THE DRAWINGS

FIG. 6 is a flowchart showing a procedure performed by a controlling unit and an image processing unit.

DESCRIPTION OF THE PREFERRED EMBODIMENTS

Hereinafter, embodiments of the present invention are described in detail with reference to figures. The liquid crystal display apparatus according to embodiments is an example of image display apparatus according to the present invention, and displays an image based on a RGB image signal input from an external device. The RGB image signal may be received through radio wave used for television broadcasting, may be read out from a recording medium, such as a digital versatile disc (DVD), or may be input through a network.

Embodiment 1

Figure 1:
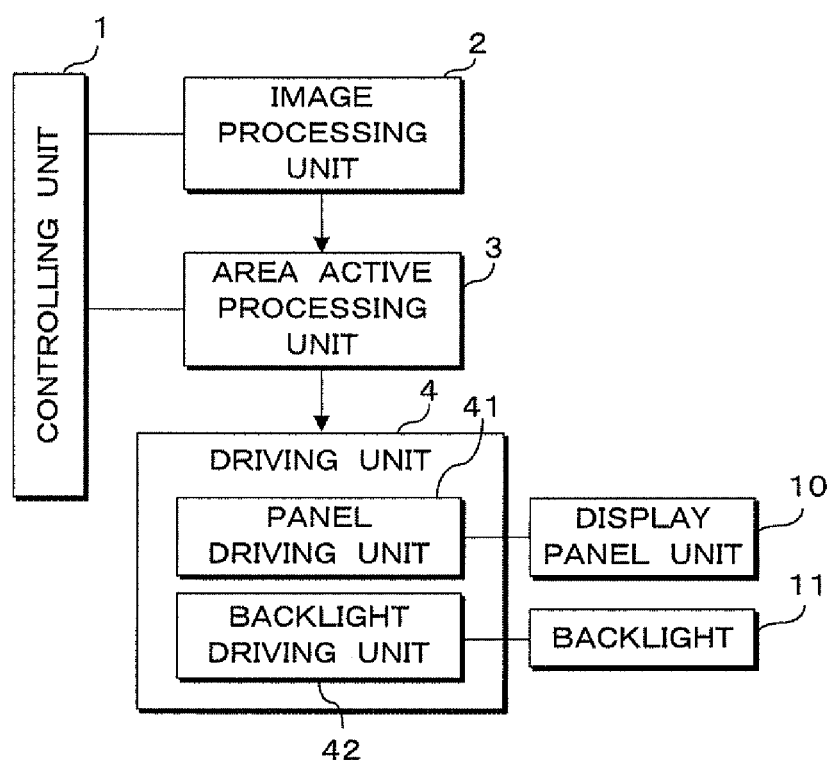
FIG. 1 is a block diagram showing a configuration of liquid crystal display apparatus according to an embodiment.

FIG. 1 is a block diagram showing a configuration of liquid crystal display apparatus according to this embodiment.

The liquid crystal display apparatus includes a controlling unit 1, an image processing unit 2, an area active processing unit 3, a display panel unit 10 and a driving unit 4 that drives a backlight 11. The display panel unit 10 is provided with the backlight 11 at the back side, and with a displaying unit at the front side which displays an image based on an input RGB image signal. The display panel unit 10 includes a display element having a pixel number based on a screen display resolution. A display element included a color filter that passes only a required light (wavelength) and blocks the other light (wavelength). Thus, the display element passes some of three colors: red (R), green (G) and blue (B). The light passes the display element and then a color image is displayed on the displaying unit. The amount of light passing the display element is determined by a passing rate of display element. The "passing rate" means a rate for enabling the liquid crystal panel to pass the light emitted from the backlight 11.

Figure 2:
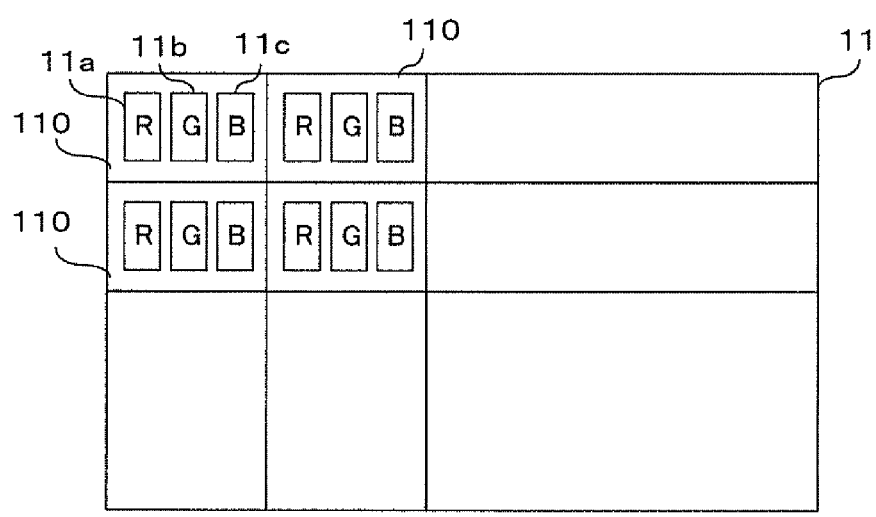
FIG. 2 is a schematic view showing a configuration of backlight.

The backlight 11 is a light source emitting light from the back side of display panel unit 10. FIG. 2 is a schematic view showing a configuration of backlight 11. The whole backlight 11 is divided into plural rectangular areas 110. Each area 110 is provided with an R-LED11a, a G-LED11b and a B-LED 11c. The backlight 11 is controlled in each area 110 to emit light. In FIG. 2, the area 110 is provided with one LED 11a, one LED 11b and one LED 11c. Alternatively, the area 110 may be provided with plural LEDs 11a, 11a, . . . , plural LEDs 11b, 11b, . . . and plural LED 11c, 11c, . . . . For example, more than one LED dedicated for the same color may be provided in the case that larger amount of light is required.

The image processing unit 2 performs several processing for the input RGB image signal. For example, the image processing unit 2 performs processing to obtain image data extracted in a predetermined period from the input RGB image signal (referred to as "frame", hereinafter), to obtain gradient information of the image data, to adjust the size of image data, and the like. Furthermore, the image processing unit 2 performs processing to output the obtained several information to the controlling unit 1 and an area active processing unit 3. Moreover, the image processing unit 2 appropriately performs several processing, such as processing to generate a RGB signal, digital transform processing, color space conversion processing, scaling processing, color correction processing, synchronization detection processing, gamma correction processing, and on-screen display (OSD) processing.

The area active processing unit 3 determines an optimal luminous efficiency for each of LEDs 11a, 11b, 11c, to refer the peak values of respective color components in one frame corresponding to the area 110, in accordance with the gradient of image data input from the image processing unit 2 and a mixing rate (described later) input from the controlling unit 1. For example, the area active processing unit 3 sets the luminous efficiency of red (R) component to be 10%, the luminous efficiency of green (G) component to be 60%, and the luminous efficiency of blue (B) component to be 30%, when the peak value of red (R) component is 10%, the peak value of green (G) component is 60% and the peak value of blue (B) component is 30% in comparison with the dynamic range. The area active processing unit 3 determines such optimal efficiencies for every area 110 in each frame.

In addition, the area active processing unit 3 determines a passing rate control value (voltage value) for each frame, in accordance with the gradient of image data and the determined luminous efficiencies. The passing rate control value is utilized for controlling the passing rate of display element included in the display panel unit 10. The area active processing unit 3 outputs the determined luminous efficiencies and passing rate control value (voltage value) to the controlling unit 1 and the driving unit 4.

The value of light passing from the display element of display panel unit 10 is the luminous efficiency of LED corresponding to the display element multiplied by the passing rate of display element. Because the luminous efficiency and the passing rate control value are determined in accordance with the gradient of image data, it is possible to reduce the electric power consumption of backlight 11. For example, in the case that the gradient of image data positioned within an area of display panel unit 10 is small, the luminous efficiencies of LEDs included in an area 110 corresponding to the area of display panel unit 10 are controlled to become smaller.

The driving unit 4 includes a panel driving unit 41 and a backlight driving unit 42. The panel driving unit 41 is a drive circuit for the display panel unit 10, and controls the passing rate of display element included in the display panel unit 10 in accordance with the passing rate control value input from the area active processing unit 3. The passing rate control value (voltage value) output from the panel driving unit 41 is charged in an electrode within each display element of display panel unit 10. Then, the tilt of liquid crystal regarding the display element is changed in accordance with the charged voltage, and thus the passing rate of display element is controlled. The backlight driving unit 42 is a drive circuit for the backlight 11, and controls the luminous efficiency for each of LEDs 11a, 11b, 11c included in the backlight 11 in accordance with the luminous efficiency input from the area active processing unit 3. The backlight driving unit 42 controls respective LEDs 11a, 11b, 11c in each area 110.

The controlling unit 1 is a microcomputer configured with a central processing unit (CPU), a read only memory (ROM) and the like. The controlling unit 1 controls each unit included in the liquid crystal display apparatus, to control the whole liquid crystal display apparatus. For example, the controlling unit 1 obtains the passing rate control value (voltage value), the luminous efficiencies of respective LEDs 11a, 11b, 11c and the like from the area active processing unit 3. Based on the information obtained from the image processing unit 2 and the area active processing unit 3, the controlling unit 1 determines whether the halo phenomenon (luminance heterogeneity or color heterogeneity) may occur or not in each area 110. When it is determined that the halo phenomenon may occur, the controlling unit 1 changes the mixing rate in order to reduce the halo phenomenon.

Next, it will be described below about a method determining whether the halo phenomenon occurs or not.

Figure 10:
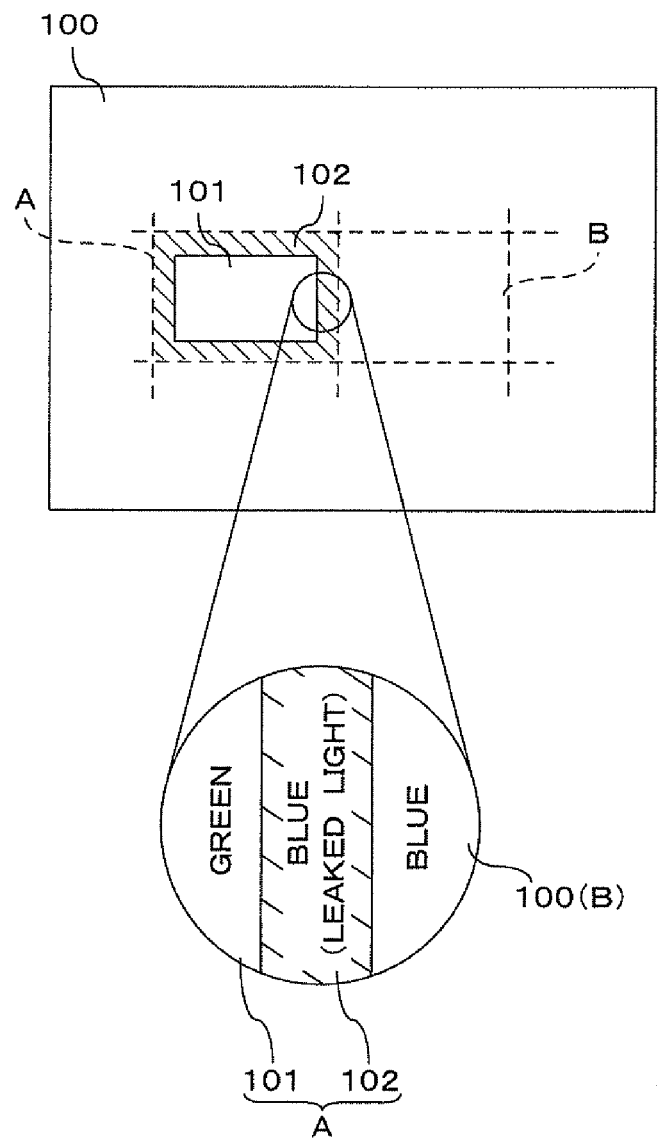
FIG. 10 is a schematic view for explaining the light leak caused by the change of luminous efficiency.

As described above, the halo phenomenon brings a faint circle of light at the contour of image and at the perimeter of contour caused by light leak passing through non-corresponding color filter from the LED. The controlling unit 1 detects the occurrence of halo phenomenon, in accordance with the luminous efficiency balance of each of LEDs 11a, 11b, 11c and with the passing rate balance of display element. For explanation purposes, it will be assumed that luminous efficiencies of LED 11a, 11b, 11c are respectively 0%, 80% and 20% in the area A of FIG. 10 and 0%, 0% and 20% in the area B of FIG. 10, and that the passing rate of display element is 100%. Furthermore, it is assumed that the leak of blue light from the G-LED 11b is 10% of G-LED 11b, and that the permissible value of light leak is less than 20% of blue light passing amount. The "permissible value" of light leak is the limit value of light leak amount that will undermine the image quality.

In this assumed case, the luminous efficiency of G-LED 11b is 80% and thus, the light leak amount is 8%. Further, the luminous efficiency of B-LED 11c is 20% and thus, the permissible value of light leak amount is 4%. Because the light leak amount of G-LED 11b is 8%, the light leak amount of G-LED 11b is larger than the permissible value of light leak amount for the B-LED 11c. In other words, the light from the G-LED 11b is mixed with the light from the B-LED 11c at the contoured portion 102 and the perimeter of contoured portion 102. Thus, it displays the blue image at the contoured portion 102 and the perimeter of contoured portion 102, and the displayed image becomes blue lighter than the blue of expected proper image. Therefore, the image processing unit 2 calculates the light leak amount and then determines in accordance with the calculation result whether the halo phenomenon may have occurred or not.

The image processing unit 2 performs the determination of halo phenomenon occurrence described above, for each pixel of display element in each frame. Then, the image processing unit 2 further performs the determination for the pixels adjacent to the pixel where it is determined that the halo phenomenon may have occurred, in order to detect sequential pixels where it is determined that the halo phenomenon may have occurred. When it is determined that the halo phenomenon may have occurred at the adjacent pixels, i.e., when the halo phenomenon may have occurred on a predetermined area in one frame (e.g., 50% of total area in one frame), the image processing unit 2 determines that the frame may include the halo phenomenon occurrence. Then, the controlling unit 1 performs the determination for sequential frames next to the frame where it is determined that the halo phenomenon may have occurred. For example, when it is determined for sequential 4 frames in which the halo phenomenon may have occurred, the processing may be performed for reducing the halo phenomenon.

It should be noted that this embodiment utilizes an example of method for determining the occurrence of halo phenomenon. Thus, it is possible to adequately change the method for detecting the occurrence of halo phenomenon, the condition utilized for determining that the halo phenomenon has occurred and the like.

Next, it will be described below about the method for reducing the occurring halo phenomenon.

When the halo phenomenon should be reduced, the area active processing unit 3 utilizes the additive color mixing to make the mixed light (i.e., composite light) obtained from light of the LEDs 11a, 11b, 11c become close to white light. When luminous efficiencies of respective LEDs are the same to each other, the mixed light from the LEDs 11a, 11b, 11c becomes white light. Thus, the area active processing unit 3 controls to make the luminous efficiencies of respective LEDs become the same to each other. In this embodiment, the area active processing unit 3 does not control the LED whose luminous efficiency is the largest in the LEDs 11a, 11b, 11c, but control to make the other LEDs become to have the same largest luminous efficiency. For example, when the G-LED 11b has the largest luminous efficiency, the area active processing unit 3 controls to make the R-LED 11a and B-LED 11c respectively become to have the largest luminous efficiency of G-LED 11b.

For making the mixed light from the LEDs 11a, 11b, 11c become close to white light, the controlling unit 1 determines a mixing rate. The "mixing rate" is a ratio for changing the luminous efficiencies of respective LEDs 11a, 11b, 11c. For example, the mixing rate is "0", when the LEDs 11a, 11b, 11c respectively have luminous efficiencies that are optimal to respective color components of image data and determined by the area active processing unit 3. In other words, when the mixing rate is "0", the controlling unit 1 does not control the luminous efficiencies of LEDs 11a, 11b, 11c. The mixing rate is "1", when the luminous efficiencies of LEDs 11a, 11b, 11c are respectively adjusted to be the same as the largest luminous efficiency in all the luminous efficiencies, i.e., when the backlight 11 becomes a white light source.

The mixing rate can be determined with a predetermined function. For example, the following equations show the luminous efficiencies rm, gm, bm with the required mixing rate where the respective efficiencies with the mixing rate "0" are r1, g1 and b1, the respective efficiencies for the white light source are r2, g2 and b2 and the required mixing rate m is set to be (0≤m<1):

$$rm=(r2-r1)\times m+r1$$

$$gm=(g2-g1)\times m+g1$$

$$bm=(b2-b1)\times m+b1$$

Figure 3A:
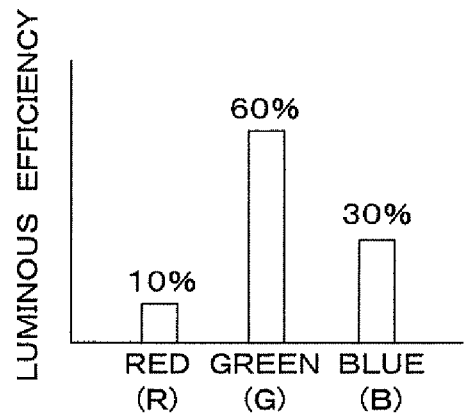
FIG. 3A is a schematic view showing a luminous efficiency of LED for each color with a mixing rate "0".
Figure 3B:
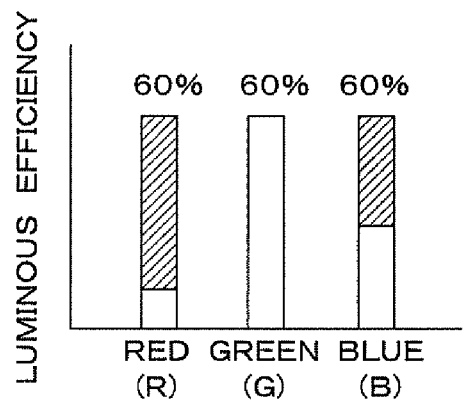
FIG. 3B is a schematic view showing the luminous efficiency of LED for each color with a mixing rate "1".
Figure 3C:
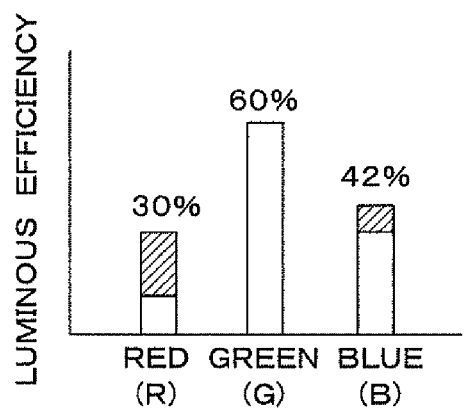
FIG. 3C is a schematic view showing the luminous efficiency of LED for each color with a mixing rate "0.4".

FIG. 3A is a schematic view showing the luminous efficiency of LED for each color with a mixing rate "0". FIG. 3B shows the case that the mixing rate is "1", and FIG. 3C shows the case that the mixing rate is "0.4". In the case that the mixing rate is "0", the luminous efficiencies of LEDs 11a, 11b, 11c are 10%, 60% and 30%, respectively (see FIG. 3A). In the case that the mixing rate is "1", the luminous efficiencies of LEDs 11a, 11b, 11c are 60%, 60% and 60%, respectively (see FIG. 3B). In the case that the mixing rate is "0.4", the luminous efficiencies of LEDs 11a, 11b, 11c are 30%, 60% and 42%, respectively (see FIG. 3C).

Because the controlling unit 1 determines the optimal mixing rate based on the detection results of image processing unit 2, a light leak amount of LED for a color becomes not more than the permissible value of light leak amount of LEDs for the other colors. Therefore, it is possible to reduce the halo phenomenon. For example, the mixing rate is determined to be 33% in the case of embodiment described above in reference to FIG. 10.

Figure 4A:
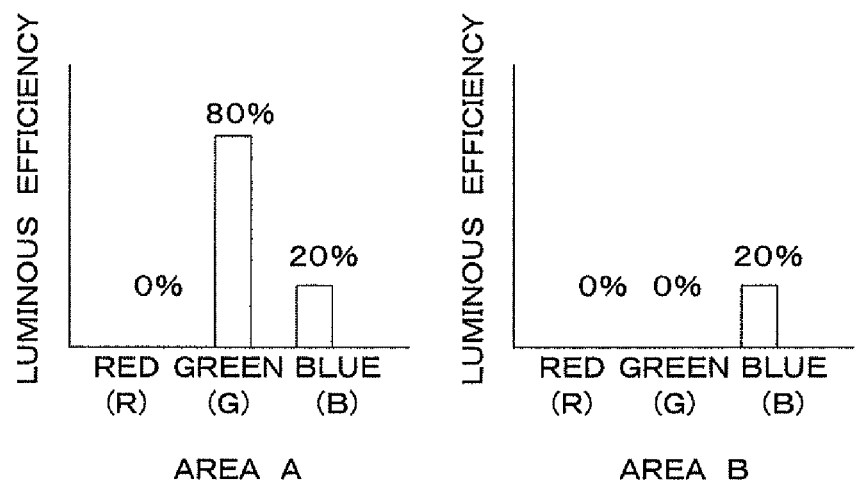
FIG. 4A is a schematic view showing the luminous efficiency of LED before changing the luminous efficiency with a mixing rate "33%".
Figure 4B:
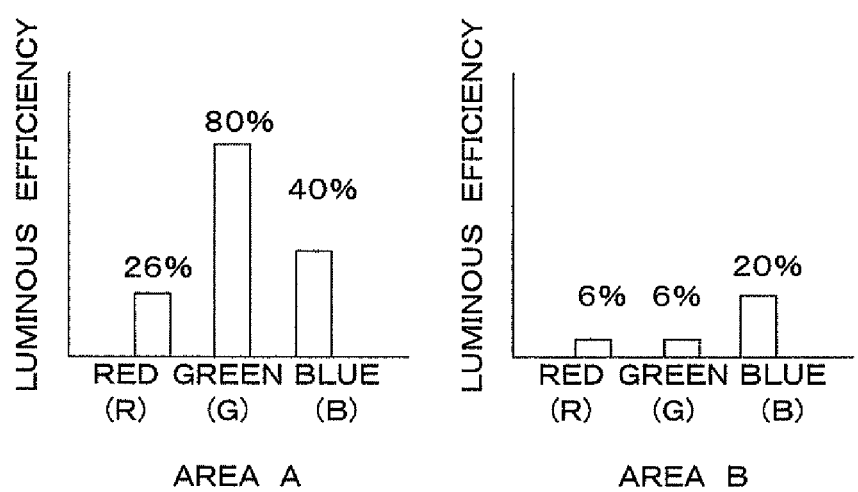
FIG. 4B is a schematic view showing the luminous efficiency of LED after changing the luminous efficiency with the mixing rate "33%".

FIG. 4A and FIG. 4B are schematic views showing the luminous efficiencies of LEDs changed with the mixing rate "33%". FIG. 4A shows the case before the luminous efficiencies are changed, and FIG. 4B shows the case after the luminous efficiencies are changed. In the area A, the luminous efficiencies of LEDs 11a, 11b, 11c are 26%, 80% and 40%, respectively. In the area B, the luminous efficiencies of LEDs 11a, 11b, 11c are 6%, 6%, and 20%, respectively. Then, the luminous efficiency of G-LED 11b is 80% and the light leak amount of G-LED 11b is 8%. In addition, the luminous efficiency of B-LED 11c is 40%, the light leak amount of B-LED 11c is 4% and the permissible value becomes double, i.e., 8%. Because the light leak amount of G-LED 11b is 8%, the light leak amount of G-LED 11b is not more than the permissible value of light leak amount of B-LED 11c. Thus, the processing is performed for reducing the halo phenomenon occurred at the contoured portion 102 and the perimeter of contoured portion 102.

The controlling unit 1 may control only the LEDs 11a, 11b, 11c located in the halo phenomenon occurring area 110 or may control the LEDs 11a, 11b, 11c located in every area 110, in accordance with the determined mixing rate. In the case that controlling unit 1 controls only the LEDs 11a, 11b, 11c located in the halo phenomenon occurring area 110, it is possible to prevent undermining the color purity of display screen corresponding to the area 110 where the halo phenomenon has not occurred, although the control of LEDs 11a, 11b, 11c in the corresponding area 110 may undermine the color purity. Furthermore, it is possible to reduce the electric power consumption of backlight 11, because the luminous efficiencies can be kept smaller. In the contrary case that controlling unit 1 controls the LEDs 11*a*, 11*b*, 11*c* located in every area 110, it is possible to uniform the color purities of whole screen. Furthermore, it is possible to minimize the scale of circuit because the required processing can be simplified.

Figure 5A:
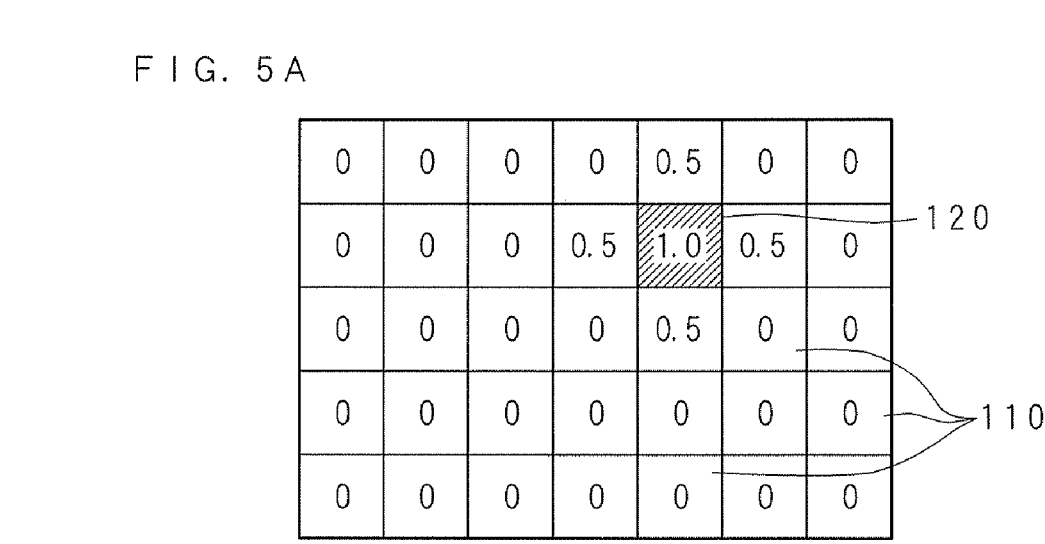
FIG. 5A is a schematic view showing a mixing rate of LED determined for each area in a frame.
Figure 5B:
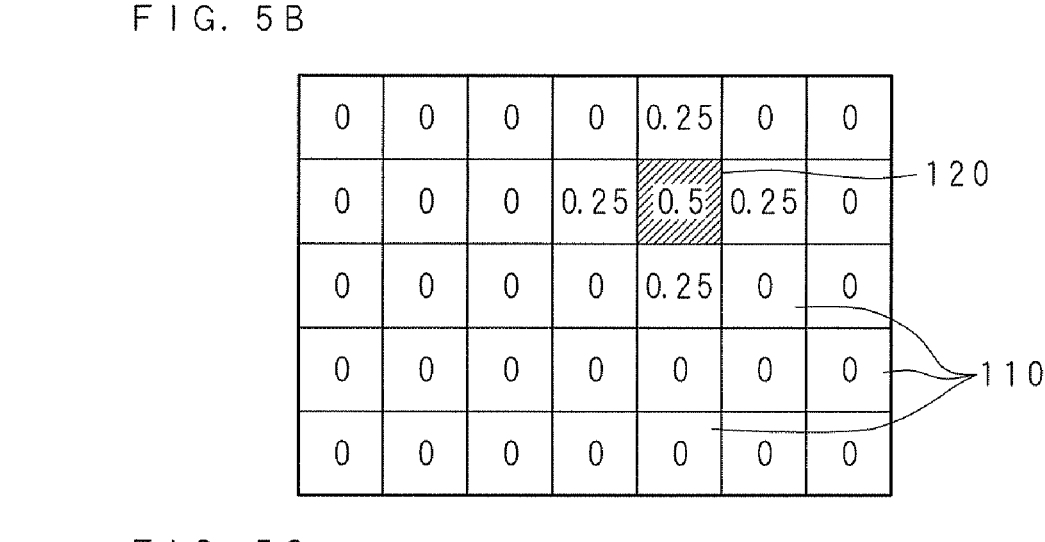
FIG. 5B is a schematic view showing another mixing rate of LED determined for each area in a frame.
Figure 5C:
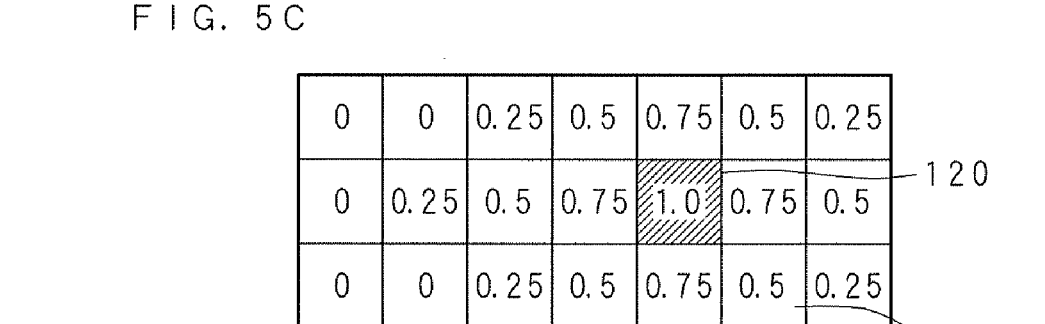
FIG. 5C is a schematic view showing another mixing rate of LED determined for each area in a frame.

The controlling unit 1 may change the mixing rate for the LEDs 11*a*, 11*b*, 11*c* located in the area where the halo phenomenon has occurred and in the perimeter of the halo phenomenon occurring area. FIG. 5A, FIG. 5B and FIG. 5C are schematic views showing about the mixing rate of LEDs 11*a*, 11*b*, 11*c* determined for each area 110 in a frame. In FIG. 5A, FIG. 5B and FIG. 5C, the mixing rate is illustrated for the LEDs 11*a*, 11*b*, 11*c* in each area 110 into which the backlight 11 is divided. In FIG. 5A, FIG. 5B and FIG. 5C, the "area 120" represents the area where the halo phenomenon has occurred.

For example, in the case that the mixing rate for LEDs 11*a*, 11*b*, 11*c* in the area 120 is "1" as shown in FIG. 5A, the controlling unit 1 determines the mixing rates for the LEDs 11*a*, 11*b*, 11*c* in four areas 110, 110, . . . adjacent to the area 120 to be "0.5". Then, the controlling unit 1 determines the mixing rates for the LEDs 11*a*, 11*b*, 11*c* in the other areas 110, 110, . . . to be "0". In other words, the mixing rates for the LEDs 11*a*, 11*b*, 11*c* are arranged to stepwise become "1" in the direction from the area 110 having the mixing rate "0" toward the area 120. Therefore, it is possible to prevent the viewer from feeling uncomfortable, although the viewer may feel uncomfortable in the case that only the colors of LEDs 11*a*, 11*b*, 11*c* in the area 120 are changed from the colors in the perimeter of area 120.

In the case that the mixing rate for the LEDs 11*a*, 11*b*, 11*c* in the area 120 is "0.5" as shown in FIG. 5B, the controlling unit 1 determines the mixing rates for the LEDs 11*a*, 11*b*, 11*c* in the areas 110, 110, . . . adjacent to the area 120 to be "0.25", and determines the mixing rates for the LEDs 11*a*, 11*b*, 11*c* in the other areas 110, 110, . . . to be "0". Therefore, the mixing rates for the LEDs 11*a*, 11*b*, 11*c* are arranged to stepwise become "0.5" in the direction from the area 110 having the mixing rate "0" toward the area 120.

In the case that the mixing rate for the LEDs 11*a*, 11*b*, 11*c* in the area 120 is "1" as shown in FIG. 5C, the controlling unit 1 determines the mixing rates to stepwise become "0.25", "0.5" and "0.75" in the direction from the area 110 having the mixing rate "0" toward the area 120. The case of FIG. 5C can implement smoother change of color purity than the cases of FIG. 5A and FIG. 5B.

For changing the determined mixing rates, the controlling unit 1 may make the light of LEDs 11*a*, 11*b*, 11*c* become close to white light, sequentially or stepwise. For example, the sequential method can implement the smooth change of color purity, and the stepwise method can change at the timing when the viewer is unaware and thus can prevent the viewer from feeling uncomfortable. Furthermore, the controlling unit 1 may adequately change the speed of the light of LEDs 11*a*, 11*b*, 11*c* becoming close to white light. For example, the viewer may not care a bit about the halo phenomenon in accordance with the area where the halo phenomenon has occurred and with the size of occurring halo phenomenon. When the light of LEDs 11*a*, 11*b*, 11*c* becomes close to white light slowly in this example case, it is possible to prevent the viewer from being aware of the color change of image displayed on the display panel unit 10. On the contrary, when the light of LEDs 11*a*, 11*b*, 11*c* becomes close to white light fast for removing the halo phenomenon, it is possible to prevent the image quality of displayed image from being undermined.

It will be described below about processes for displaying an image on the screen of liquid crystal display apparatus as described above, in response to the input RGB signal. FIG. 6 is a flowchart showing a procedure performed by the controlling unit 1 and the image processing unit 2.

The image processing unit 2 obtains the RGB image signal input from an external device (S1), and obtains the luminous efficiency and passing rate control value in a frame of RGB image signal (S2). The image processing unit 2 obtains the luminous efficiency and passing rate control value determined by the area active processing unit 3 or obtains the luminous efficiency and passing rate control value estimated by itself. The image processing unit 2 detects whether the halo phenomenon may occur or not in each pixel of display element (S3), and detects whether the number of sequential pixels where the halo phenomenon may occur is a predetermined value or not (S4). According to the results of these processes, it is detected whether the halo phenomenon may occur or not in the frame (S5). Particularly, the image processing unit 2 calculates the light leak amount of LED and performs the detection processing based on the calculated results as described above.

The controlling unit 1 determines in accordance with the detection results of S5 whether the halo phenomenon may occur or not in the frame (S6). When having determined that the halo phenomenon does not occur (S6: NO), the controlling unit 1 completes the procedure for this frame and then performs similar procedure for the next frame. When having determined that the halo phenomenon may occur (S6: YES), the controlling unit 1 determines whether the number of sequential frames where it is determined that the halo phenomenon may occur is not less than 4 or not (S7). When having determined that the number is less than 4 (S7: NO), the controlling unit 1 completes the procedure for this frame and then performs similar procedure for the next frame.

When having determined that the number is not less than 4 (S7: YES), the controlling unit 1 performs processing for reducing the halo phenomenon (S8). Particularly, the controlling unit 1 determines the optimal mixing rate, and makes the light leak amount of LED for a color become not more than the permissible value of light leak amount of LED for another color, in order to reduce the halo phenomenon. At that time, the controlling unit 1 may control only the LEDs 11*a*, 11*b*, 11*c* located in the halo phenomenon occurring area 110, or may controls the LEDs 11*a*, 11*b*, 11*c* located in every area 110. Then, the controlling unit 1 completes the procedure.

The controlling unit 1 stops controlling the mixing rate for the LEDs 11*a*,11*b*,11*c*, when the controlling unit 1 is controlling the mixing rate for the LEDs 11*a*,11*b*,11*c* and it is determined that the halo phenomenon may not have occurred. In other words, the controlling unit 1 controls to make the light from the LEDs 11*a*, 11*b*, 11*c* close to white light become far from the white light.

As described above, the liquid crystal display apparatus according to this embodiment determines whether the halo phenomenon occurs or not in each frame of RGB image signal. Then, the liquid crystal display apparatus according to this embodiment makes the light from the LEDs 11*a*, 11*b*, 11*c* become close to white light when there are sequential frames where it is determined that the halo phenomenon may have occurred. Thus, the color filter of display element can block the white light and the leak amount of light from the backlight 11 can be reduced. Therefore, it is possible to reduce the problem that the quality of displayed image is undermined due to the undesired light passing from the backlight 11.

Although this embodiment is explained to perform the processing for reducing the halo phenomenon when sequential four frames are determined to have the occurring halo phenomenon, it is possible to adequately change the number of sequential frames. For example, it is possible to determine the number of sequential frames in accordance with the interval for extracting frames. In addition, it is possible to control only the LEDs 11a, 11b, 11c located in the halo phenomenon occurring area 110, or control the LEDs 11a, 11b, 11c located in every area 110 as described above.

Embodiment 2

It will be described below about an embodiment 2. The embodiment 1 is illustrated to determine only whether the halo phenomenon may occur or not, but this embodiment 2 can determine the likelihood degree of halo phenomenon occurrence and changes the control speed of mixing rate for the LEDs based on the determined likelihood degree. The following explanation is directed to only such a difference.

The controlling unit 1 of liquid crystal display apparatus according to this embodiment classifies the likelihood degree of halo phenomenon occurrence into 10 ranks, and changes the mixing rate for the LED 11a, 11b, 11c at the speed based on the classified results. It should be noted that there are the change of mixing rates for making the light from the LEDs 11a, 11b, 11c become close to white light and for making the light from the LEDs 11a, 11b, 11c become far from white light. The light from the LEDs 11a, 11b, 11c becoming far from white light means controlling to make the mixing rate return to (get close to) "0", after the LEDs 11a, 11b, 11c are controlled with some mixing rate and thus the halo phenomenon is eliminated (reduced). For example, the controlling unit 1 classifies the case having no light leak and no halo phenomenon occurrence into the rank "0", and classifies the case having the light leak amount that is twice of light leak amount permissible value into the rank "10", for determining the proper rank in accordance with the light leak amount.

For making the light from the LEDs 11a, 11b, 11c become close to white light, the controlling unit 1 requires about 60 msec for completing the control at each value of rank. For example, in the case that the likelihood degree of halo phenomenon occurrence is classified into the rank "4", the controlling unit 1 requires 240 (=60×4) msec for completing the control with mixing rate determined to reduce the halo phenomenon, and makes the light from the LEDs 11a, 11b, 11c become close to white light.

For making the light from the LEDs 11a, 11b, 11c become close to white light, the controlling unit 1 requires about 250 msec for shifting the control at each value of rank. For example, in the case that the likelihood degree of halo phenomenon occurrence is classified into the rank "4" and then halo phenomenon is eliminated (i.e., the rank becomes "0"), the controlling unit 1 requires 1000 (=250×4) msec for completing the control with the mixing rate "0", and makes the light from the LEDs 11a, 11b,11c become far from white light.

When the processing is performed at the faster speed for making the light from LEDs 11a, 11b, 11c become close to white light, it is possible to display the image and to prevent the viewer from being aware of the halo phenomenon occurrence as described above. On the contrary, when the processing is performed for making the light from LEDs 11a, 11b, 11c become far from white light at the slower speed than the processing performed for making the light from LEDs 11a, 11b, 11c become close to white light, it is possible to prevent the viewer from feeling uncomfortable due to the drastic change of color.

As described above, the liquid crystal display apparatus according to this embodiment makes the light from the LEDs 11a, 11b, 11c become close to white light for a short time in the case the halo phenomenon has occurred, and thus reduces the halo phenomenon. Furthermore, the liquid crystal display apparatus makes the light from the LEDs 11a, 11b, 11c become far from white light at the speed slower than the speed for making the light from the LEDs 11a, 11b, 11c become close to white light in the case that the halo phenomenon is eliminated (reduced).

It should be noted that the speed for changing the mixing rate of LEDs 11a, 11b, 11c can be changed, adequately. For example, in the case that the occurring halo phenomenon is negligible in the displayed image, the processing may be performed slowly for making the light from the LEDs 11a, 11b, 11c become close to white light. In this case, it is possible to prevent the viewer from feeling uncomfortable due to the drastic change of color. On the contrary, in the case that the occurring halo phenomenon is significant in the displayed image, the processing may be performed fast for making the light from the LEDs 11a, 11b, 11c become close to white light, in order to eliminate the halo phenomenon. In this case, it is possible to prevent undermining the image quality.

Embodiment 3

Next, it will be described below about an embodiment 3 according to the present invention. Although the embodiment 1 and the embodiment 2 are illustrated to perform the processing for reducing the halo phenomenon in the case that the halo phenomenon may have occurred, this embodiment 3 may not perform the halo phenomenon in accordance with the likelihood degree of halo phenomenon occurrence. The following explanation is directed to only such a difference.

The image processing unit 2 of liquid crystal display apparatus according to this embodiment determines the likelihood degree of halo phenomenon occurrence for each pixel. For example, when the number of pixels where it is determined that the halo phenomenon may occur is not less than the half number of all pixels included in one frame, the image processing unit 2 does not perform the processing for reducing the halo phenomenon on the frame. The reason is that the viewer may neglect the occurring halo phenomenon in the case that the halo phenomenon occurs in the half and more of all pixels included in one frame.

Figure 7A:
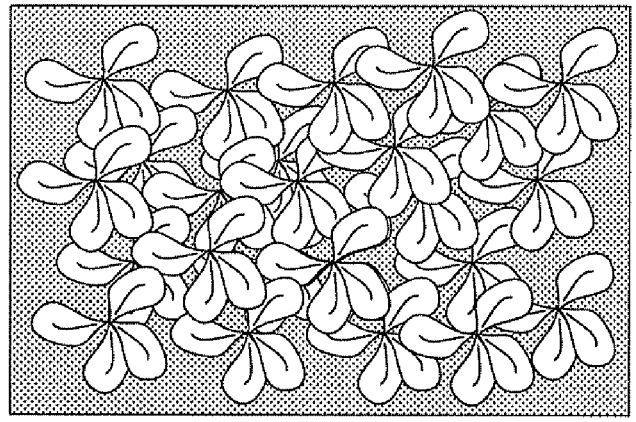
FIG. 7A shows an example of image that does not require reducing a halo phenomenon.
Figure 7B:
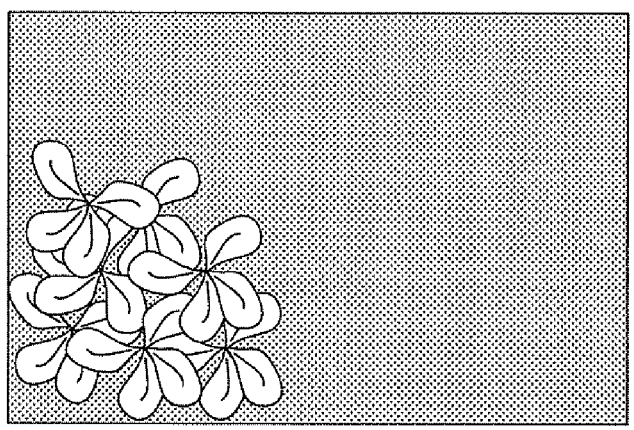
FIG. 7B shows an example of image that requires reducing the halo phenomenon.

FIG. 7A shows an example of image that does not require reducing the halo phenomenon, and FIG. 7B shows an example of image that requires reducing the halo phenomenon. In the images of FIG. 7A and FIG. 7B, many leaves are drawn on the blue sky background.

Assume the example case that the image of FIG. 7A is displayed on the display panel unit 10 and then the halo phenomenon has occurred on all images of leaves. The example case means that the halo phenomenon has occurred on almost whole screen. Thus, the viewer may feel that the halo phenomenon occurring images are the original proper images. Because of these reasons, the controlling unit 1 does not perform the processing for reducing the halo phenomenon when the halo phenomenon has occurred on the half or more of whole area in each frame. Hence, it is possible to display the image in which the original colors are preferred. Therefore, it is possible to improve the image quality.

Assume another example case that the image of FIG. 7B is displayed on the display panel unit 10 and then the halo phenomenon has occurred on all images of leaves. This example case means that the halo phenomenon has occurred on a part of whole screen. Thus, the viewer may feel uncomfortable due to the halo phenomenon. Because of these reasons, the controlling unit 1 performs the processing for reducing the halo phenomenon when the halo phenomenon has occurred on less than half of whole area in each frame.

Figure 8:
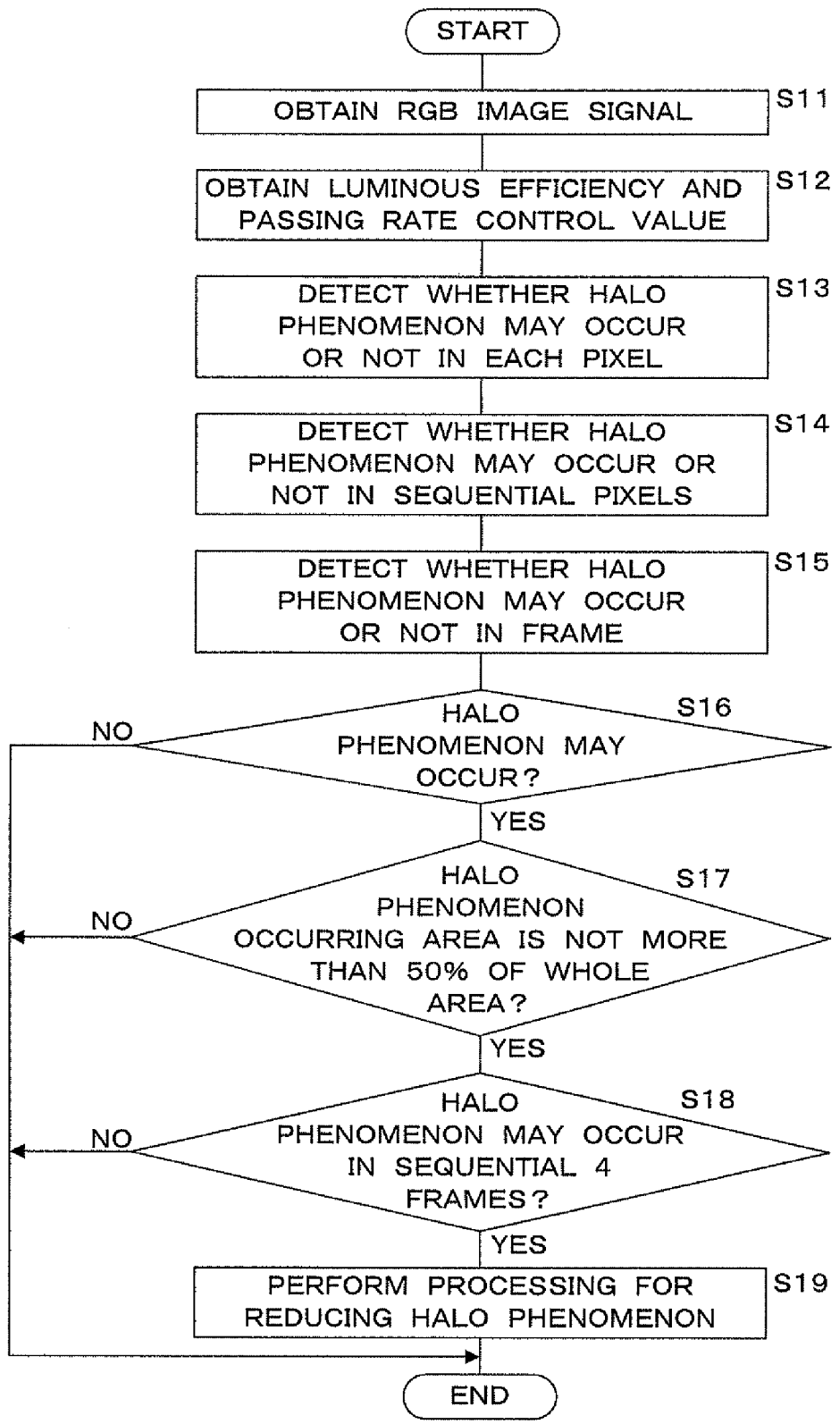
FIG. 8 is a flowchart showing another procedure performed by the controlling unit and the image processing unit.
Figure 9:
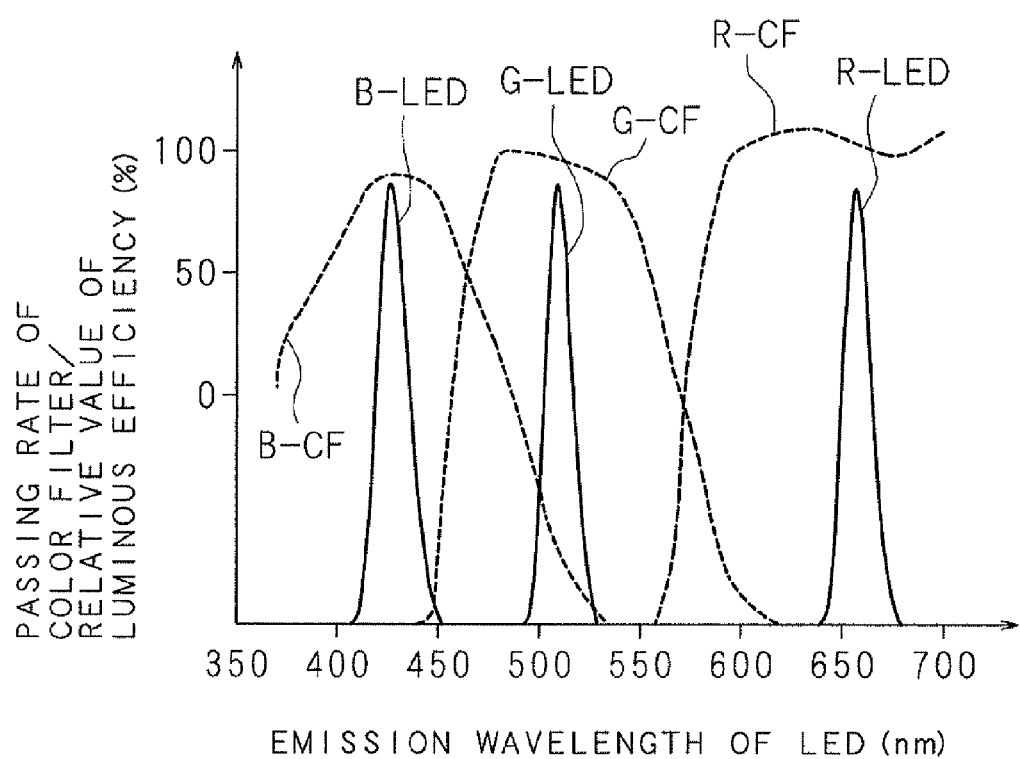
FIG. 9 is a schematic view showing relationships between the passing characteristics of color filter utilized for the liquid crystal panel and wavelengths of R-LED, G-LED and B-LEDs.

FIG. 8 is a flowchart showing the procedure performed by the controlling unit 1 and the image processing unit 2.

The image processing unit 2 obtains the RGB image signal input from an external device (S11), and obtains the luminous efficiency and passing rate control value in a frame of RGB image signal (S12). The image processing unit 2 detects whether the halo phenomenon may occurs or not in each pixel of display element (S13), and detects whether the number of sequential pixels where the halo phenomenon may occur is a predetermined value or not (S14). Particularly, the image processing unit 2 calculates the light leak amount of LED and performs the detection processing based on the calculated results as described above.

The controlling unit 1 detects the halo phenomenon in the frame (S15) and then determines whether the halo phenomenon may occur or not (S16). When having determined that the halo phenomenon does not occur (S16: NO), the controlling unit 1 completes the procedure for this frame and then performs similar procedure for the next frame. When having determined that the halo phenomenon may occur (S16: YES), the controlling unit 1 determines whether the number of pixels where it is determined that the halo phenomenon may occur is not more than 50% of all pixels included in the frame or not (S17). For example, in the case that the halo phenomenon has occurred on almost whole screen, the viewer may feel that the halo phenomenon occurring images are included in the original proper image, and may neglect the halo phenomenon. On the other hand, in the case that the halo phenomenon has occurred on a part of whole screen, the viewer may feel uncomfortable against the displayed image.

When having determined that the number of pixels where it is determined that the halo phenomenon may occur is more than 50% of all pixels (S17: NO), the controlling unit 1 determines that the viewer will neglect the halo phenomenon because the halo phenomenon is expected to occur on the half and more of whole screen, and then completes the procedure without performing the processing for reducing the halo phenomenon. When having determined that the number of pixels where it is determined that the halo phenomenon may occur is not more than 50% of all pixels (S17: YES), the controlling unit 1 determines that the halo phenomenon may occur in the frame and then determines whether the number of sequential frames where it is determined that the halo phenomenon may occur is not less than 4 or not (S18).

When having determined that the number is less than 4 (S18: NO), the controlling unit 1 completes the procedure for this frame and then performs similar procedure for the next frame. The reason is that it is possible to reduce the risk that the color purity is compromised and the quality of displayed image is undermined due to the greater control of light source than seemed necessity because the processing for reducing the halo phenomenon is not performed in accordance with the number of sequential frames where it is determined that the halo phenomenon may occur. When having determined that the number is not less than 4 (S18: YES), the controlling unit 1 performs processing for reducing the halo phenomenon (S19). Particularly, the controlling unit 1 determines the optimal mixing rate, and makes the light leak amount of LED for a color become not more than the permissible value of light leak amount of LED for another color, in order to reduce the halo phenomenon. At that time, the controlling unit 1 may control only the LEDs 11*a*, 11*b*, 11*c* located in the halo phenomenon occurring area 110, or may controls the LEDs 11*a*, 11*b*, 11*c* located in every area 110. Then, the controlling unit 1 completes the procedure.

As described above, the liquid crystal display apparatus according to this embodiment performs the processing for reducing the halo phenomenon when the number of pixels where it is determined that the halo phenomenon may occur is not more than a predetermined value, but does not perform the processing when the number of pixels is more than the predetermined value. Because the viewer may neglect the halo phenomenon occurring on a complicated image, the failure of performing processing for reducing the halo phenomenon can lead to display the image in which the original color purity is kept.

The controlling unit 1 may perform the processing for reducing the halo phenomenon when there are sequential frames on which the processing for reducing halo phenomenon should be performed as shown in the embodiment 1. In addition, the controlling unit 1 may perform the processing for reducing halo phenomenon for each frame. Although the 50% of all pixels is utilized for comparing to the number of pixels where the halo phenomenon may occur, the comparison value can be changed adequately. For example, it is possible to configure that the processing for reducing the halo phenomenon is not performed when the number of pixels where it is determined that the halo phenomenon may occur is more than a predetermined percentage of all pixels.

It should be understood that the embodiments described herein are only illustrative of the present invention and that various modifications may be made thereto without departing from the scope of the invention as defined in the appended claims.

The invention claimed is:

1. An image display apparatus, comprising:
a displaying unit that includes plural display elements;
plural light sources that emit light for a predetermined display element among the plural display elements;
a color filter that blocks predetermined light among light emitted by the plural light sources from being emitted to the predetermined display element;
a controlling unit that controls an image displayed on the displaying unit in accordance with a gradient of an input image data;
a detecting unit that detects a luminance heterogeneity or a color heterogeneity caused by a light leak of a light source other than a light source corresponding to the color filter on the image displayed on the displaying unit, the detection of luminance heterogeneity or color heterogeneity including determining a luminous efficiency at adjacent light sources of the display element; determining a light leak amount for the adjacent light sources based on the determined luminous efficiencies, and determining whether the light leak amount is larger than a permissible value of light leak amount; and
an identifying unit that identifies a display element, among the plural display elements, in which the luminance heterogeneity or color heterogeneity detected by the detecting unit occurs, wherein
the controlling unit performs a control that makes a mixture of light from the plural light sources that emit light to the display element identified by the identifying unit substantially become white.

2. An image display apparatus according to claim 1, wherein
a speed for completely performing the control by the controlling unit is faster than a speed for completely canceling the completely performed control.

3. An image display apparatus to claim 1, further comprising:
a determining unit that determines whether a ratio of display elements identified by the identifying unit to the plural display elements included by the displaying unit is not less than a predetermined value; and
a banning unit that permits the controlling unit to perform the control for implementing white when the determining unit determines that the ratio is not less than the predetermined value, and bans the controlling unit from performing the control for implementing white when the determining unit determines that the ratio is less than the predetermined value.

4. An image display apparatus according to claim 1, further comprising:
a backlight that is configured with all light sources that emit light to the plural display elements included in the displaying unit.

5. An image display apparatus according to claim 1, wherein
the controlling unit changes a speed performing the control for implementing white, in accordance with a result of detection performed by the detecting unit.

6. An image display apparatus according to claim 1, wherein
the controlling unit changes a speed performing the control for implementing white, in accordance with a number of display elements where the luminance heterogeneity or the color heterogeneity detected by the detecting unit occurs.

7. An image display apparatus according to claim 5, wherein
the controlling unit performs the control to make the mixture of light from the plural light sources that emit light to the display element identified by the identifying unit stepwise become white.

8. An image display apparatus according to claim 6, wherein
the controlling unit performs the control to make the mixture of light from the plural light sources that emit light to the display element identified by the identifying unit stepwise become white.

9. An image display apparatus according to claim 1, wherein
the controlling unit adjusts luminous efficiencies of the plural light sources that emit light to the display element identified by the identifying unit, to perform the control for implementing white.

10. An image display apparatus according to claim 9, wherein
the controlling unit controls the luminous efficiencies of the plural light sources that emit light to the display element identified by the identifying unit, to perform the control that makes the mixture of light from the plural light sources that emit light to the display element identified by the identifying unit substantially become white with an additive color mixing.

11. An image display apparatus according to claim 9, wherein
the controlling unit controls to make all luminous efficiencies of the plural light sources that emit light to the display element identified by the identifying unit become equal to the largest luminous efficiency of the plural light sources that emit light to the display element identified by the identifying unit.

12. An image display apparatus according to claim 9, wherein
the detecting unit detects the luminance heterogeneity or the color heterogeneity, for each frame of an image displayed on the displaying unit,
the controlling unit performs the control for implementing white, when the detecting unit detects the luminance heterogeneity or the color heterogeneity in each of predetermined sequential plural frames, and
the controlling unit does not perform the control for implementing white, when the detecting unit does not detect the luminance heterogeneity or the color heterogeneity in each of predetermined sequential plural frames.

13. An image display apparatus according to claim 9, wherein
the controlling unit performs the control for implementing white on the plural light sources that emit light to a display element existing at a perimeter of the display element identified by the identifying unit, and
the controlling unit controls to make the mixture of light from the plural light sources that emit light to the display element identified by the identifying unit substantially become white, closer than a mixture of light from the plural light sources that emit light to the display element existing at the perimeter of the display element identified by the identifying unit.

14. An image display apparatus according to claim 13, wherein
the controlling unit performs the control for implementing white on plural display elements existing at the perimeter of the display element identified by the identifying unit.

15. An image display method, comprising steps of:
preparing a displaying unit that includes plural display elements;
preparing plural light sources that emit light for a predetermined display element among the plural display elements;
preparing a color filter that blocks predetermined light among light emitted by the plural light sources from being emitted to the predetermined display element;
inputting an image data;
detecting a luminance heterogeneity or a color heterogeneity caused by a light leak of a light source other than a light source corresponding to the color filter on an image displayed on the displaying unit, the detection of luminance heterogeneity or color heterogeneity including determining a luminous efficiency at adjacent light sources of the display element; determining a light leak amount for the adjacent light sources based on the determined luminous efficiencies, and determining whether the light leak amount is larger than a permissible value of light leak amount;
identifying a display element, among the plural display elements, in which the detected luminance heterogeneity or color heterogeneity occurs; and
performing a control that makes a mixture of light from the plural light sources that emit light to the identified display element substantially become white.

16. An image display method according to claim 15, further comprising steps of:
obtaining luminous efficiencies of the plural light sources that emit light to the identified display element; and
adjusting the luminous efficiencies of the plural light sources that emit light to the identified display element, to perform the control for implementing white.

17. An image display method according to claim 15, further comprising a step of:

preparing a backlight configured with all light sources that emit light to the plural display elements included in the displaying unit.

18. An image display method according to claim 15, further comprising a step of:
controlling to make all luminous efficiencies of the plural light sources that emit light to the identified display element become equal to the largest luminous efficiency of the plural light sources that emit light to the identified display element.

19. An image display method according to claim 15, further comprising steps of:
detecting a luminance heterogeneity or a color heterogeneity, for each frame of an image displayed on the displaying unit;
performing the control for implementing white when the luminance heterogeneity or the color heterogeneity is detected in each of predetermined sequential plural frames; and
not performing the control for implementing white when the luminance heterogeneity or the color heterogeneity is not detected in each of predetermined sequential plural frames.

20. An image display method according to claim 15, further comprising a step of:
controlling to make a speed for completely performing the control for implementing white become faster than a seed for completely canceling the completely performed control.

\* \* \* \* \*